(12) United States Patent
Wang et al.

(10) Patent No.: US 11,276,156 B2
(45) Date of Patent: Mar. 15, 2022

(54) GAUSSIAN IMAGE QUALITY ANALYSIS TOOL AND METHOD FOR OPERATION

(71) Applicant: GM Global Technology Operations LLC, Detroit, MI (US)

(72) Inventors: Keyu Wang, Novi, MI (US); Sanket Yadav, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 16/736,393

(22) Filed: Jan. 7, 2020

(65) Prior Publication Data

US 2021/0209742 A1 Jul. 8, 2021

(51) Int. Cl.
*G06K 9/00* (2022.01)
*G06T 7/00* (2017.01)

(52) U.S. Cl.
CPC .. *G06T 7/0002* (2013.01); *G06T 2207/10016* (2013.01); *G06T 2207/30168* (2013.01); *G06T 2207/30252* (2013.01)

(58) Field of Classification Search
CPC ......... G06T 7/0002; G06T 2207/10016; G06T 2207/30168; G06T 2207/30252
USPC ....................................................... 382/100
See application file for complete search history.

(56) References Cited

U.S. PATENT DOCUMENTS

| | | | | |
|---|---|---|---|---|
| 10,785,456 B1* | 9/2020 | Schroeder | ............ | H04N 5/2253 |
| 2008/0095402 A1* | 4/2008 | Kochi | ..................... | G06T 7/248 382/103 |
| 2011/0103648 A1* | 5/2011 | Wiedemann | ......... | G06K 9/0063 382/103 |
| 2014/0355881 A1* | 12/2014 | Bhardwaj | ............. | G06T 7/0002 382/173 |
| 2017/0316253 A1* | 11/2017 | Phillips | ..................... | G06T 7/50 |

OTHER PUBLICATIONS

Zhan, Yibing, and Rong Zhang. "No-reference image sharpness assessment based on maximum gradient and variability of gradients." IEEE Transactions on Multimedia 20.7 (2017): 1796-1808. (Year: 2017).*

* cited by examiner

*Primary Examiner* — Jonathan S Lee
(74) *Attorney, Agent, or Firm* — Vivacqua Crane PLLC (57) ABSTRACT

A camera image cleaning system of an automobile vehicle includes a camera generating a camera image of a vehicle environment. A processor having a memory executes a control logic to convert the camera image into a grayscale image having multiple image pixels. A convolution equation is retrieved from the memory and is solved to find derivations of the grayscale image defining changes of pixel intensity between consecutive or neighbor ones of the multiple image pixels of the grayscale image. A magnitude and an orientation of the multiple pixels is computed by the processor and used to differentiate weak ones of the image pixels from strong ones of the image pixels.

16 Claims, 4 Drawing Sheets

GAUSSIAN IMAGE QUALITY ANALYSIS TOOL AND METHOD FOR OPERATION

INTRODUCTION

The present disclosure relates to automobile vehicle camera systems and systems to clean camera images.

Automobile vehicles, and particularly autonomous driving vehicles utilize one or more cameras to obtain images of the vehicle environment. Image quality is a paramount issue in maintaining a fully functioning autonomous operating system. Image quality may suffer if the camera lens or viewing port becomes degraded due to environmental conditions including rain, snow, dirt and the like. Camera cleaning systems have therefore been developed to automatically clean the camera lens(es). Image comparison is commonly performed using peak signal-to-noise ratio analyses, however common image analysis methods are highly dependent on and are limited by the test procedure used. Full-reference image analysis methods rely on progressive image-to-image analysis of the camera video and are therefore defective when even slight vibrations of the video images occur due to for example minor motion changes of the target, camera or the environment in the camera video, as the vibration error in an earlier image impacts each successive image.

Thus, while current image analyses methods for analyzing vehicle camera systems achieve their intended purpose, there is a need for a new and improved system and method for operating a gaussian image quality analysis system.

SUMMARY

According to several aspects, a camera image cleaning system of an automobile vehicle includes a camera generating a camera image of a vehicle environment. A processor having a memory executes a control logic to convert the camera image into a grayscale image having multiple image pixels. A convolution equation is retrieved from the memory and is solved to find derivations of the grayscale image defining changes of pixel intensity between consecutive or neighbor ones of the multiple image pixels of the grayscale image. A magnitude and an orientation of the multiple pixels is computed by the processor and used to differentiate weak ones of the image pixels from strong ones of the image pixels.

In another aspect of the present disclosure, a Euclidean distance equation is retrieved from the memory and applied by the processor to compute the magnitude and orientation of the image pixels of the grayscale image; and a variance is calculated by the processor using functions of a program tuned for iterative analysis and design processes with a programming language that expresses matrix and array mathematics directly.

In another aspect of the present disclosure, a predetermined threshold magnitude is applied wherein the weak ones of the image pixels are differentiated from the strong ones of the image pixels with the weak ones of the image pixels having a magnitude below the predetermined threshold magnitude.

In another aspect of the present disclosure, an upper threshold bound and a lower threshold bound are applied to further differentiate the strong ones of the image pixels from the weak ones of the image pixels having individual ones of the image pixels with magnitudes greater than the upper threshold bound retained.

In another aspect of the present disclosure, ones of the image pixels with magnitudes smaller than the lower threshold bound being filtered out.

In another aspect of the present disclosure, for the image pixels having magnitudes in-between the upper threshold bound and the lower threshold bound a comparison to eight neighbor pixels is applied.

In another aspect of the present disclosure, ones of the image pixels are retained if a magnitude of the ones of the image pixels in-between the upper threshold bound and the lower threshold bound is greater than other image pixels neighboring the ones of the image pixels.

In another aspect of the present disclosure, if a magnitude of any of the other image pixels neighboring the ones of the image pixels in between the upper threshold bound and the lower threshold bound is greater than the magnitude of the ones of the image pixels in-between the upper threshold bound and the lower threshold bound the ones of the image pixels in between the upper threshold bound and the lower threshold bound are filtered out.

In another aspect of the present disclosure, wherein the image pixels of the grayscale image include white pixels and black pixels, the processor identifying if the grayscale image has more of the white pixels than the black pixels during the calculation of the variance.

In another aspect of the present disclosure, an 8-connected method is used to differentiate the weak ones of the image pixels from the strong ones of the image pixels.

In another aspect of the present disclosure, a sharp image having substantially zero blurred ones of the image pixels is assigned a blur number 1 and a blurred image having at least one blurred ones of the image pixels at least partially blocked by a vision interference item is assigned a blur number [0,1].

According to several aspects, a method for operating a gaussian image quality analysis system of an automobile vehicle includes: analyzing a camera cleaning system using steps including: importing a camera image from a camera system; converting the camera image to a grayscale image; analyzing the grayscale image to find derivations using a convolution equation; computing magnitudes and orientations of image pixels of the grayscale image using a Euclidean distance equation; differentiating weak ones of the pixels defined as pixels that are determined to be below a predetermined threshold magnitude and orientation from strong ones of the pixels; calculating a variance; and normalizing the variance so that a sharpest image is assigned a blur number 1 and a blurred image is assigned a blur number [0,1].

In another aspect of the present disclosure, the method further includes repeating the analyzing steps for a second camera cleaning system.

In another aspect of the present disclosure, the method further includes comparing results of the analyzing steps of the first camera cleaning system to the second camera cleaning system and identifying a shortest time to change from an initial blur number to a final blur number.

In another aspect of the present disclosure, the method further includes choosing a fixed time interval after the first cleaning system is initiated and the second cleaning system is initiated.

In another aspect of the present disclosure, the method further includes measuring blur number increases for the first cleaning system and the second cleaning system over the fixed time interval.

In another aspect of the present disclosure, the method further includes: defining an upper threshold bound and a lower threshold bound for the pixels; filtering out pixels with magnitudes smaller than the lower threshold bound; and retaining pixels with magnitudes greater than the upper threshold bound.

According to several aspects, a method for operating a gaussian image quality analysis system of an automobile vehicle includes: analyzing a camera cleaning system using steps including: importing multiple camera images from a camera system; converting the camera images to grayscale images; analyzing the grayscale images as sequential frames to find derivations using a convolution equation; computing magnitudes and orientations of pixels of the grayscale images using a Euclidean distance equation; differentiating weak ones of the pixels defined as pixels that are below a predetermined threshold magnitude and orientation from strong ones of the pixels for the sequential frames; and calculating a variance for individual ones of the sequential frames; repeating the analyzing steps for a second camera cleaning system; and comparing results of the analyzing steps for the first camera cleaning system to the analyzing steps for the second camera cleaning system.

In another aspect of the present disclosure, the method further includes filtering out the weak ones of the pixels and retaining the strong ones of the pixels defined as pixels that are above the predetermined threshold magnitude.

In another aspect of the present disclosure, the method further includes: defining an upper threshold bound and a lower threshold bound for the pixels; filtering out pixels with magnitudes smaller than the lower threshold bound; and retaining pixels with magnitudes greater than the upper threshold bound.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
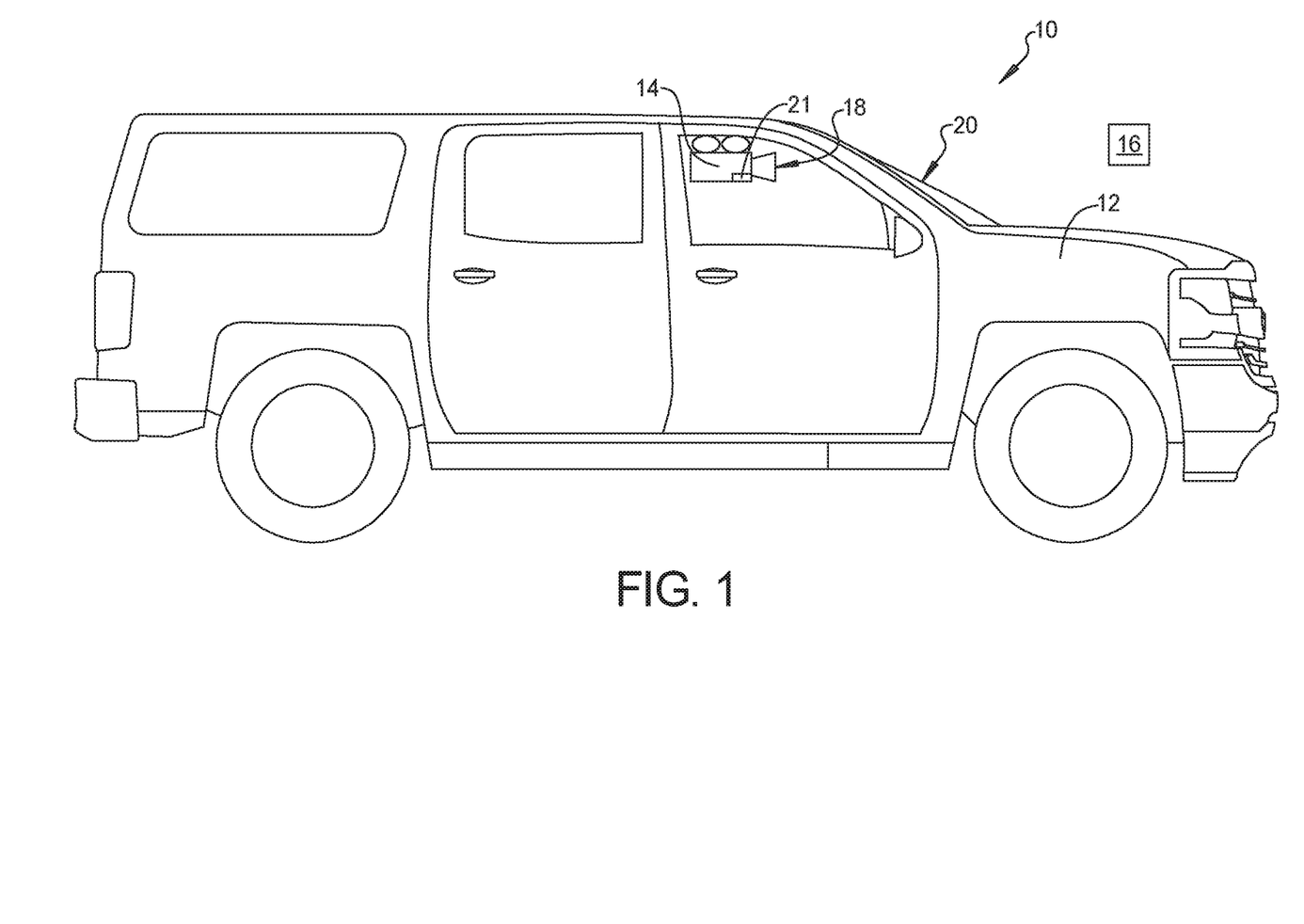
FIG. 1 is a side elevational view of an automobile vehicle having a gaussian image quality analysis tool and system according to an exemplary aspect.

Referring to FIG. 1, a gaussian image quality analysis tool system and method for operation 10 is used with respect to an automobile vehicle 12 such as an autonomously operated vehicle. The automobile vehicle 12 includes a camera system 14 provided for example on an exterior surface of the automobile vehicle 12 used to collect images of an operating environment 16 of the automobile vehicle 12 during operation. The camera system 14 can be positioned at any location on the automobile vehicle 12 including outside of a window frame as shown, at a front grill area, on a roof surface, on an engine hood surface, and the like. According to further aspects, the camera system 14 can also be located within an interior compartment of the automobile vehicle 12.

Figure 2:
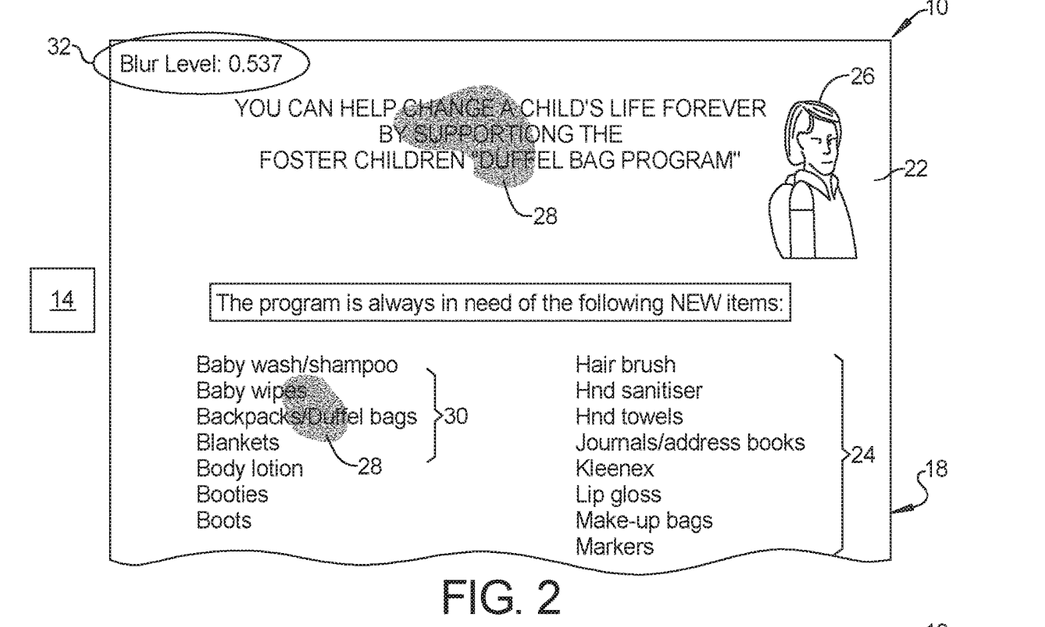
FIG. 2 is a front elevational view of an exemplary degraded image captured by a camera system.

The camera system 14 collects images of the operating environment 16 of the automobile vehicle 12 shown and described in greater detail in reference to FIG. 2 which define frames of a video. During operation of the automobile vehicle 12 the images may become at least partially degraded by vision interference items which can include moisture, dirt, and foreign matter that can contact a data receiving port 18 such as a camera lens of the camera system 14. The vision interference items can also collect on a windshield 20 of the automobile vehicle 12 and thereby interfere with data collected via the data receiving port 18. It is desirable to maximize the data and image quality collected by the camera system 14, therefore the camera system 14 incudes a cleaning system 21 to mitigate the vision interference items. The gaussian image quality analysis tool system and method for operation 10 provides a system and method to differentiate between multiple different cleaning systems 21 to maximize an image quality provided by the camera system 14.

Referring to FIG. 2 and again to FIG. 1, an exemplary degraded camera image 22 collected by the camera system 14 can include features 24 such as text and objects 26 which can include people, signs, roadway environment items and the like. The features 24 and objects 26 of each camera image 22 may be compared to similar features and objects saved in a memory of the gaussian image quality analysis tool system and method for operation 10 for recognition and differentiation. As noted above the ability to distinguish the features 24 and objects 26 of each camera image 22 may be detrimentally impacted by the presence of vision interference items 28 which may produce one or more visually blurred items 30 defined as images visually blocked or at least partially visually blocked by items such as water, dirt, and the like present on the data receiving port 18 such as a camera lens of the camera which may not be recognizable by the camera system 14. The vision interference items 28 may occur on or blocking light through the data receiving port 18 at the windshield 20.

Figure 3:
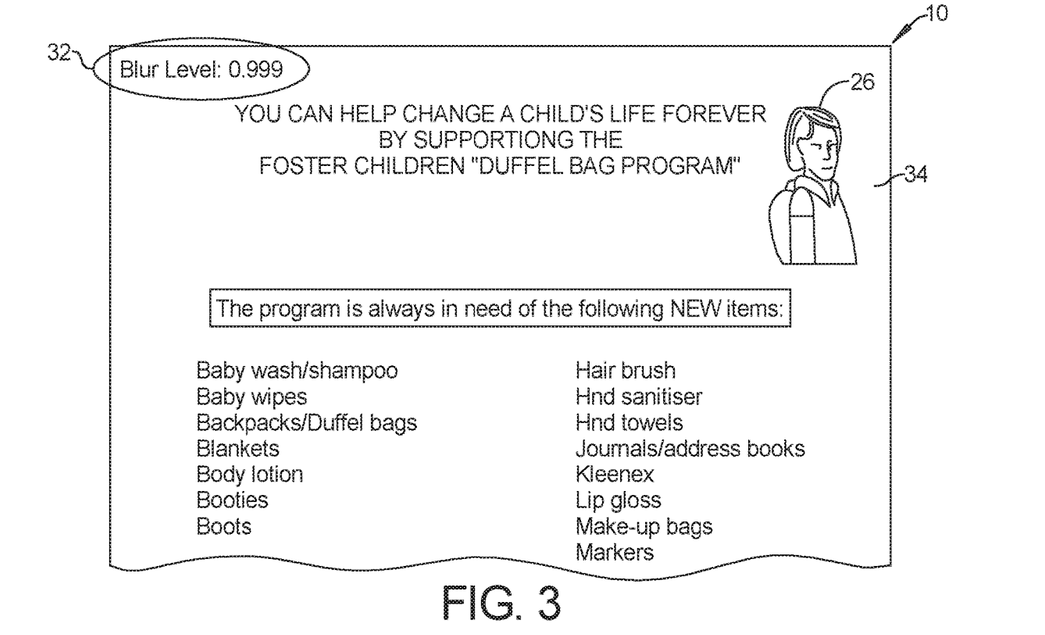
FIG. 3 is a front elevational view of a clean image.

After analysis of the degraded camera image 22 using the camera cleaning system 21, the gaussian image quality analysis tool system and method for operation 10 provides a blur level indication 32, which according to several aspects defines a number ranging from 0.000 to 1.000, indicating an approximate percentage of the degraded camera image 22 clearly distinguishable from a reference or clean image shown and described in reference to FIG. 3. In the example provided, the blur level indication 32 is indicated as approximately 0.537, wherein the blur level indication 32 is calculated by determining a variance of the degraded camera image 22 and dividing the variance of the degraded camera image 22 by a variance of the reference or "clean" camera image.

Referring to FIG. 3 and again to FIG. 2, an exemplary clean image 34 is distinguished from the degraded camera image 22 after cleaning using the camera cleaning system 21. In this example, the blur level indication 32 is approximately 0.999. The vision interference items 28 have been substantially removed, eliminating the one or more visually blurred items 30 shown in FIG. 2.

Referring to FIG. 4 and again to FIGS. 1 through 3, the gaussian image quality analysis tool system and method for operation 10 applies a control logic defining an algorithm 36 that may distinguish between outputs of different camera cleaning systems 21 using the following exemplary steps. A high-level mechanization of each step is as follows. In a first step the image such as the degraded camera image 22 is imported into a processor 38. In a second step, the image such as the degraded camera image 22 is converted using the processor 38 to a grayscale image 40 using functions of the control logic or algorithm 36 including a programming language, however the algorithm 36 is not limited to a particular function. Each pixel of the image such as the degraded camera image 22 is represented by one single number. This is achieved through grayscaling (three red-green-blue (RGB) numbers will become one). The RGB image can be converted into grayscale by a following exemplary operation: Grayscale=[0.2989*R+0.5870*G+0.114*B] where, R=red component of the pixel, G=green component, B=blue component.

Figure 4:
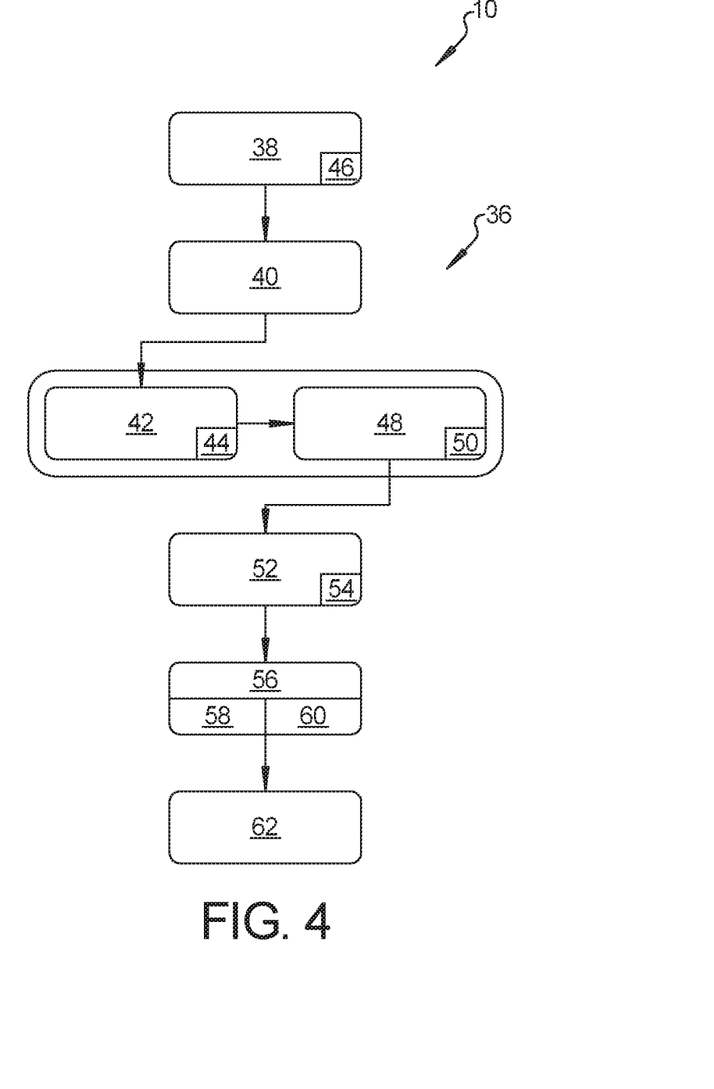
FIG. 4 is a flow diagram of the steps of an algorithm used by the gaussian image quality analysis tool and system of the present disclosure.

In a third step, the grayscale image 40 of the second step is analyzed by the processor 38 to find derivations 42 using a convolution operation 44 below, retrieved from a memory 46 of the processor 38. Finding the derivations 42 is defined herein as looking for a rapid change of pixel intensity between consecutive or neighbor ones of the multiple pixels. The equation below is the convolution operation retrieved from the memory 46 and used to find the derivation.

$$I(x, y) = \sum_{m=-a}^{a} \sum_{n=-b}^{b} K(m, n) \times f(x-m, y-n)$$

Figure 5:
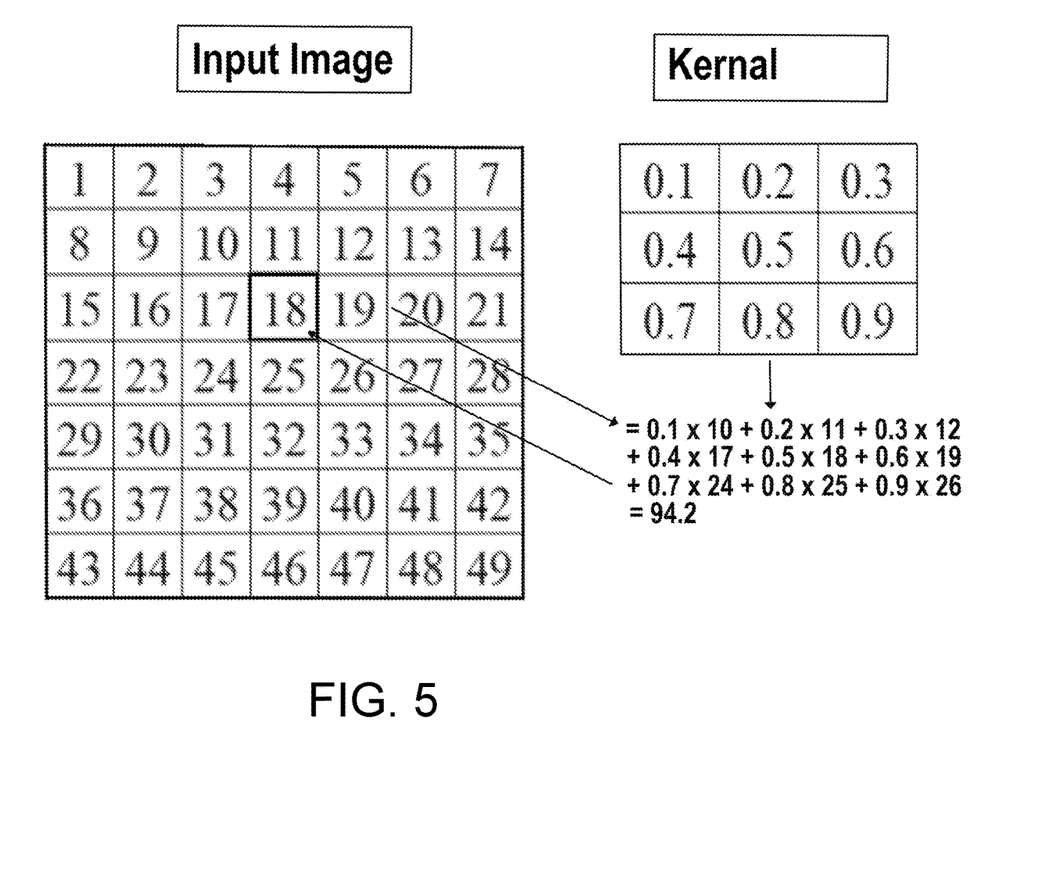
FIG. 5 is a graphic illustration of a convolutional operation used to find a derivation.

A graphic illustration is shown in FIG. 5. A "kernel matrix" used is shown below. $K_{Gx}$ is used to find the derivation 42 in an x-direction, $K_{Gy}$ is used to find the derivation 42 in a y-direction.

$$K_{Gx} = \begin{bmatrix} -1 & 0 & 1 \\ -2 & 0 & 2 \\ -1 & 0 & 1 \end{bmatrix}$$

$$K_{Gy} = \begin{bmatrix} 1 & 2 & 1 \\ 0 & 0 & 0 \\ -1 & -2 & -1 \end{bmatrix}$$

The convolution operation 44 is conducted by the processor 38 for every pixel with the "kernel matrices" identified above. The results are two metrics (x and y direction) with the size of the image.

In a fourth step, magnitudes and orientations 48 of the image pixels are computed by the processor 38 using a Euclidean distance equation 50 also retrieved from the memory 46. Magnitudes and orientations 48 of the pixels will in a following fifth step described below work as the tools to filter out low-strength pixels by only focusing on the pixels with high strength (high magnitude). Magnitude is a dimensionless number representing a strength of the pixel. Orientation (angle) identifies how the true edges map through the image (directions).

$$|G| = \sqrt{G_x^2 + G_y^2} \qquad \text{Equation 48}$$

To find the magnitude: a mathematical way to sum two values in the x and y directions, the two metrics (from the third step) are combined using the processor 38 from the equation below retrieved from the memory 46:

$$\theta = \tan^{-1}\left(\frac{|G_y|}{|G_x|}\right)$$

In a fifth step, a predetermined threshold magnitude 52 saved in the memory 46 is retrieved and applied to distinguish "weak" ones of the pixels as distinguished from "strong" ones of the pixels. Weak pixels are defined as pixels that are determined to be below the predetermined threshold magnitude 52 and an orientation and are identified using an 8-connected method 54 saved in the memory 46 and applied by the processor 38. The "threshold" is a filtering process to find strong pixels and distinguish the strong pixels from the weak pixels. As an example of the threshold magnitudes an upper threshold bound=400 and a lower threshold bound=80. These exemplary threshold bounds are tuned for different test setups to achieve the most accurate and consistent results. For example: different background images; e.g., a checker-board, a plain wall, and the like have different sets of upper and lower threshold bounds.

In the 8-connected method 54 the pixels are neighbors to every other pixel that touches one of the pixel edges or corners. The pixels are connected horizontally, vertically, and diagonally. In a sixth step, a threshold magnitude 56 differentiated by a high threshold bound 58 and a low threshold bound 60 described above are retrieved from the memory 46 and are applied by the processor 38 to identify "strong" ones of the pixels and sort the "strong" pixels defined as pixels having a magnitude above the predetermined threshold magnitude 56 from the "weak" pixels, again using the 8-connected method 54 to distinguish between the strong pixels and the weak pixels. It is noted that finding high and low magnitude pixels is not alone sufficient to determine if the pixels are a part of a strong edge. When a pixel is between the upper threshold bound 58 and the lower threshold bound 60 the pixel is considered to be part of the true or strong edge of the image if the pixel is surrounded by other pixels having magnitudes lower than a magnitude of a center one of the pixels.

After identifying the upper threshold bound 58 and the lower threshold bound 60 pixels with magnitudes smaller than the lower threshold bound 60 are filtered out as they are considered as NOT True Edges. Pixels with magnitudes greater than the upper threshold bound 58 are retained and considered as part of the True Edges. Pixels with magnitudes in between these bounds are compared with their eight neighbor pixels respectively. If a magnitude of the pixel in between the upper threshold bound 58 and the lower threshold bound 60 is greater than all its neighbor pixels, that pixel will be kept and considered as part of the True Edges. If one of its neighbor's magnitudes is greater, that pixel is filtered out and considered as NOT True Edges. Applying the upper threshold bound 58 and the lower threshold bound 60 provides a more refined way to distinguish strong pixels than simply having a single threshold. Using the upper threshold bound 58 and the lower threshold bound 60 ensures that only true edge pixels are counted, which eliminates high frequency noise. The output of the sixth step is a black and white image with all the strong pixels set to 1 and everything else set to zero (0).

In a seventh step, a variance 58 is calculated by the processor 38 using functions of a program tuned for iterative analysis and design processes with a programming language that expresses matrix and array mathematics directly, that can for example create scripts that combine code, output, and formatted text. The following exemplary equations retrieved from the memory 46 may be used:

$$\mu = \frac{1}{N}\sum_{i=2}^{N} |A_i - \mu|^2$$

Where $\mu$ is the mean of A.

$$\mu = \frac{1}{N}\sum_{i=2}^{N} A_i$$

The variance 58 is a representation of a sharpness of the image.

According to several aspects, the grayscale image 40 has white pixels and black pixels. If the image has more white pixels, meaning more edges, then the variance 58 of that frame or image is high. Similarly, if the image has less white pixels and more black pixels, meaning less edges, then the variance 58 is low. The variance 58 is then normalized so that a sharpest image has a blur number 1 and a blurred image has a blur number [0,1]. It is noted that the variance 58 is not the only way to represent how blurred an image is. For example, the processor 38 may calculate a standard deviation, or a mean may be used as a measure to define a quality of the images.

According to several aspects, the gaussian image quality analysis tool system and method for operation 10 may be used for comparisons between different camera cleaning systems. The cameras of the different cleaning systems are set to capture roughly the same view, defining the same target and the same direction. To maximize comparison accuracy the user limits the differences between two different videos to represent only the cleaning system which was used during the recording. To compare cleaning efficiencies such as increase of blur level versus change in time, the user chooses a fixed time interval, e.g., the first 0.5 sec after the cleaning system is initiated and measures the blur level increases. To compare cleaning systems, if it takes for example a time of 0.5 seconds (sec) for system A to get to a blur level of 0.86 from an initial blur level of 0.56 (0.3/0.5 sec) and a time for system B to get from a blur level of 0.89 from 0.65 (0.24/0.5 sec), then system A has greater cleaning efficiency than system B despite its lower blur level (0.86 compared to 0.89).

The gaussian image quality analysis tool system and method for operation 10 removes the need of a sophisticated lighting setup for capturing the video for the camera cleaning system 22 to be analyzed. The gaussian image quality analysis tool system and method for operation 10 functions using any general video format and does not require any additional tools/setups. Parameters can be tuned for video capture in different environments. Vibration or motion of the camera, vehicle, or platform does not impact the analysis. When importing the camera image from the camera system a previous camera image is omitted to eliminate a vibrational input occurring in the previous camera image. For example, the gaussian image quality analysis tool system and method for operation 10 is not impacted by engine and vehicle vibration at idle operating conditions, such as vibration having a maximum amplitude of 0.3 m/sec$^2$; a root mean square=0.07 m/sec$^2$; at a frequency of 28 Hz where most vehicle engine vibration takes place.

A gaussian image quality analysis tool system and system of the present disclosure offers several advantages. These include the capability to quantify for example from zero to 1.0 an image quality of each frame in a video. The Gaussian approach of the present disclosure analyzes each frame individually by counting the sharp edges identified in that frame. Using an exemplary processor, the system of the present disclosure has been found to be capable of analyzing a 30 second video at 30 frames per second in less than 45 seconds of processing time. The system of the present disclosure also reduces dependence on previous frame data and provides an analysis which is not susceptible to minor motion/change of the camera or the environment. A processing time is also reduced by importing the video through the scripts. An output provides a plot showing a quality of each frame, or an annotated video.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A camera image cleaning system of an automobile vehicle, comprising:
    a camera generating a camera image of a vehicle environment;
    a processor having a memory and executing a control logic to analyze a camera cleaning system using analyzing steps including:
        importing the camera image from the camera system;
        converting the camera image to a grayscale image;
        finding derivations of the grayscale image using a convolution equation;
        computing magnitudes and orientations of image pixels of the grayscale image using a Euclidean distance equation;
        differentiating weak ones of the image pixels defined as image pixels that are below a predetermined threshold magnitude and orientation from strong ones of the image pixels;
        calculating a variance;
        normalizing the variance so that a sharp image having substantially zero blurred ones of the image pixels is assigned a blur number 1 and a blurred image having at least one blurred ones of the image pixels blocked by a vision interference item is assigned a blur number [0,1],
        repeating the analyzing steps for a second camera cleaning system; and
        comparing the camera cleaning system to the second camera cleaning system and identifying a shortest time to change from an initial blur number for the blurred image to a final blur number for the sharp image.

2. The camera image cleaning system of the automobile vehicle of claim 1, further including an upper threshold bound and a lower threshold bound applied to further differentiate the strong ones of the image pixels from the weak ones of the image pixels having individual ones of the image pixels with magnitudes greater than the upper threshold bound retained.

3. The camera image cleaning system of the automobile vehicle of claim 2, further including ones of the image pixels with magnitudes smaller than the lower threshold bound being filtered out.

4. The camera image cleaning system of the automobile vehicle of claim 2, wherein for the image pixels having magnitudes in-between the upper threshold bound and the lower threshold bound a comparison to eight neighbor pixels is applied.

5. The camera image cleaning system of the automobile vehicle of claim 4, wherein ones of the image pixels are retained if a magnitude of the ones of the image pixels in-between the upper threshold bound and the lower threshold bound is greater than other image pixels neighboring the ones of the image pixels.

6. The camera image cleaning system of the automobile vehicle of claim 5, wherein if a magnitude of any of the other image pixels neighboring the ones of the image pixels in between the upper threshold bound and the lower threshold bound is greater than the magnitude of the ones of the image pixels in-between the upper threshold bound and the lower threshold bound the ones of the image pixels in between the upper threshold bound and the lower threshold bound are filtered out.

7. The camera image cleaning system of the automobile vehicle of claim 1, wherein the image pixels of the grayscale image include white pixels and black pixels, the processor identifying if the grayscale image has more of the white pixels than the black pixels during the calculation of the variance.

8. The camera image cleaning system of the automobile vehicle of claim 1, further including an 8-connected method used to differentiate the weak ones of the image pixels from the strong ones of the image pixels.

9. A method for operating a gaussian image quality analysis system of an automobile vehicle, comprising:
   analyzing a camera cleaning system using analyzing steps including:
      importing a camera image from a camera system;
      converting the camera image to a grayscale image;
      finding derivations of the grayscale image using a convolution equation;
      computing magnitudes and orientations of image pixels of the grayscale image using a Euclidean distance equation;
      differentiating weak ones of the image pixels defined as image pixels that are below a predetermined threshold magnitude and orientation from strong ones of the image pixels;
      calculating a variance;
      normalizing the variance so that a sharp image having substantially zero blurred ones of the image pixels is assigned a blur number 1 and a blurred image having at least one blurred ones of the image pixels blocked by a vision interference item is assigned a blur number [0,1],
      repeating the analyzing steps for a second camera cleaning system; and
      comparing the camera cleaning system to the second camera cleaning system and identifying a shortest time to change from an initial blur number for the blurred image to a final blur number for the sharp image.

10. The method for operating the gaussian image quality analysis system of the automobile vehicle of claim 9, further including choosing a fixed time interval after the camera cleaning system is initiated and the second camera cleaning system is initiated.

11. The method for operating the gaussian image quality analysis system of the automobile vehicle of claim 10, further including measuring blur number increases for the camera cleaning system and the second camera cleaning system over the fixed time interval.

12. The method for operating the gaussian image quality analysis system of the automobile vehicle of claim 9, wherein the importing the camera image from the camera system omits a previous camera image to eliminate a vibrational input impacting the previous camera image.

13. The method for operating the gaussian image quality analysis system of the automobile vehicle of claim 9, further including:
   defining an upper threshold bound and a lower threshold bound for the image pixels;
   filtering out image pixels with magnitudes smaller than the lower threshold bound; and
   retaining image pixels with magnitudes greater than the upper threshold bound.

14. A method for operating a gaussian image quality analysis system of an automobile vehicle, comprising:
   analyzing a first camera cleaning system using analyzing steps including:
      importing multiple camera images from a camera system;
      converting the camera images to grayscale images;
      finding derivations of the grayscale images as sequential frames using a convolution equation;
      computing magnitudes and orientations of image pixels of the grayscale images using a Euclidean distance equation;
      differentiating weak ones of the image pixels defined as image pixels that are below a predetermined threshold magnitude and orientation from strong ones of the image pixels for the sequential frames; and
      calculating a variance for individual ones of the sequential frames;
      normalizing the variance so that a sharp image having substantially zero blurred ones of the image pixels is assigned a first blur number and a blurred image having at least one blurred ones of the image pixels blocked by a vision interference item is assigned a second blur number;
   repeating the analyzing steps for a second camera cleaning system; and
   comparing results of the analyzing steps for the first camera cleaning system to the analyzing steps for the second camera cleaning system and identifying a shortest time to change from an initial blur number for the blurred image to a final blur number for the sharp image.

15. The method for operating the gaussian image quality analysis system of the automobile vehicle of claim 14, further including filtering out the weak ones of the image pixels and retaining the strong ones of the image pixels defined as image pixels that are above the predetermined threshold magnitude.

16. The method for operating the gaussian image quality analysis system of the automobile vehicle of claim 14, further including:
   defining an upper threshold bound and a lower threshold bound for the image pixels;
   filtering out image pixels with magnitudes smaller than the lower threshold bound; and retaining image pixels with magnitudes greater than the upper threshold bound.

\* \* \* \* \*